US012715422B2

(12) United States Patent
Byun

(10) Patent No.: US 12,715,422 B2
(45) Date of Patent: Aug. 25, 2026

(54) DEVICE AND METHOD FOR CONTROLLING POWER SUPPLY IN A VEHICLE

(71) Applicants: HYUNDAI MOTOR COMPANY, Seoul (KR); KIA CORPORATION, Seoul (KR)

(72) Inventor: Seok Ju Byun, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 88 days.

(21) Appl. No.: 18/746,403

(22) Filed: Jun. 18, 2024

(65) Prior Publication Data

US 2025/0153703 A1 May 15, 2025

(30) Foreign Application Priority Data

Nov. 9, 2023 (KR) ........................ 10-2023-0154829

(51) Int. Cl.

*B60W 20/13* (2016.01)
*B60W 30/182* (2020.01)
*B60W 50/14* (2020.01)

(52) U.S. Cl.

CPC .......... *B60W 20/13* (2016.01); *B60W 30/182* (2013.01); *B60W 50/14* (2013.01); *B60W 2510/244* (2013.01); *B60W 2540/215* (2020.02)

(58) Field of Classification Search

CPC .... B60W 20/13; B60W 30/182; B60W 50/14; B60W 2510/244; B60W 2540/215; B60L 58/20; B60L 50/60; B60L 2240/54; B60L 2250/30; G06Q 50/40; B60Y 2200/91; B60Y 2300/92; B60Y 2400/112; Y02T 10/70

See application file for complete search history.

(56) References Cited

U.S. PATENT DOCUMENTS

| | | | | |
|---|---|---|---|---|
| 10,377,389 | B2 * | 8/2019 | Bryan | B60L 1/02 |
| 10,500,966 | B2 * | 12/2019 | Chen | H02M 1/15 |
| 11,801,769 | B1 * | 10/2023 | Ferchau | H01M 10/482 |
| 2020/0198561 | A1 * | 6/2020 | Weed | B62D 63/04 |
| 2020/0247428 | A1 * | 8/2020 | Dutta Bordoloi | B60W 50/14 |
| 2021/0129779 | A1 * | 5/2021 | Kim | G05B 19/042 |
| 2021/0394580 | A1 * | 12/2021 | Chopard | G08G 1/143 |
| 2025/0042350 | A1 * | 2/2025 | Richardson | B60L 15/2072 |

* cited by examiner

*Primary Examiner* — Sze-Hon Kong

(74) *Attorney, Agent, or Firm* — MCDONNELL BOEHNEN HULBERT & BERGHOFF LLP

(57) ABSTRACT

A device for controlling a vehicle includes an input device that receives an input of a user, and a processor that determines whether to supply power to a first controller for controlling a function selected based on a selection scheme and a second controller for controlling an unselected function when a utility mode is activated based on the input of the user and then the selection scheme for selecting a function to be used among functions controllable in the utility mode is set.

19 Claims, 5 Drawing Sheets

DEVICE AND METHOD FOR CONTROLLING POWER SUPPLY IN A VEHICLE

CROSS REFERENCE TO RELATED APPLICATIONS

This application claims the benefit of priority to Korean Patent Application No. 10-2023-0154829, filed in the Korean Intellectual Property Office on Nov. 9, 2023, the entire contents of which are incorporated herein by reference.

TECHNICAL FIELD

The present disclosure relates to a device and a method for controlling a vehicle. More specifically, the present disclosure relates to a device and a method for controlling a vehicle that may minimize battery discharge in a utility mode of an electric vehicle.

BACKGROUND

An electric vehicle travels by receiving a driving force from an electric motor. To this end, the electric vehicle is equipped with a large-capacity battery that supplies power to the electric motor and a low-power battery that supplies power to various convenience devices in the vehicle.

Generally, when the vehicle is traveling, the convenience devices in the vehicle are operated using the low-power battery. However, recently, when the vehicle is stopped for a long time without traveling, a utility mode that allows the convenience devices in the vehicle to be operated using a high-voltage battery to improve a convenience of a user is provided. The user may use the utility mode to use the convenience devices (electrical devices) in the vehicle for a long time when the vehicle is not traveling.

When the utility mode is selected by the user, the vehicle controls all of the convenience devices in the vehicle to be in a standby state such that a convenience device selected by the user is able to operate. Because the battery is discharged slightly even in the standby state, when the utility mode is maintained for a long time, one or more convenience devices are controlled to be in the standby state for a long time, which increases a battery discharge amount.

SUMMARY

The present disclosure has been made to solve the above-mentioned problems occurring in the prior art while advantages achieved by the prior art are maintained intact.

An aspect of the present disclosure provides a device and a method for controlling a vehicle that may prevent an increase in a battery discharge amount in a utility mode of the electric vehicle.

Another aspect of the present disclosure provides a device and a method for controlling a vehicle that may prevent unnecessary battery discharge by allowing only functions selected by a user in a utility mode of the electric vehicle to operate and turning off unselected functions.

Another aspect of the present disclosure provides a device and a method for controlling a vehicle that may prevent unnecessary battery discharge by automatically selecting a function to be provided to a user based on a vehicle location and surrounding environment information and turning off an unselected function even when the user does not select the function in a utility mode of the electric vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling a vehicle includes an input device that receives an input of a user, and a processor that determines whether to supply power to a first controller for controlling a function selected based on a selection scheme and a second controller for controlling an unselected function when it is determined that a utility mode is activated based on the input of the user and the selection scheme for selecting a function to be used among functions controllable in the utility mode is set and control to supply the power or cut off the power to the first controller in response to determination result.

In one implementation, the processor may output a guidance message guiding the user to set the selection scheme.

In one implementation, the selection scheme may include a first scheme of selecting the function to be used based on the input of the user and a second scheme of automatically selecting the function to be used.

In one implementation, the processor may determine to supply the power to the first controller to control a first function and determine to cut off the power supply to the second controller when the selection scheme is set to the first scheme and the first function to be used is selected based on the first scheme.

In one implementation, the processor may store the first controller for controlling the first function and a first condition where the power is supplied to the first controller to control the first function when the power supply to the first controller is determined to control the first function.

In one implementation, the processor may count the number of times the power is supplied to the first controller to control the first function in the first condition for a predetermined period, and calculate a probability that the power is supplied to the first controller to control the first function in the first condition.

In one implementation, the processor may store the first function controlled in the first condition as the function automatically selected based on the second scheme when the probability exceeds a reference value.

In one implementation, the processor may determine whether the function automatically selected based on the second scheme is stored when the selection scheme is set to the second scheme.

In one implementation, the processor may determine to supply the power to the first controller to control the function automatically selected based on the second scheme, and determine to cut off the power supply to the second controller when the selection scheme is set to the second scheme and it is determined that the function automatically selected based on the second scheme is stored.

In one implementation, the processor may acquire at least one of vehicle surroundings information or vehicle state information, or any combination thereof and select the function to be used based on the at least one of the vehicle surroundings information or the vehicle state information, or any combination thereof when the selection scheme is set to the second scheme and it is determined that the function automatically selected based on the second scheme is not stored.

In one implementation, the processor may output a guidance message guiding the function selected based on the at least one of the vehicle surroundings information or the vehicle state information, or any combination thereof.

In one implementation, the processor may determine whether an additional function has been selected by the user in addition to the function selected based on the at least one of the vehicle surroundings information or the vehicle state information, or any combination thereof.

In one implementation, the processor may store the first controller for controlling the additional function and a second condition where the power is supplied to the first controller to control the additional function when it is determined that the additional function has been selected.

In one implementation, the processor may count the number of times the power is supplied to the first controller to control the additional function in the second condition for a predetermined period, and calculate a probability that the power is supplied to the first controller to control the additional function in the second condition.

In one implementation, the processor may store the additional function controlled in the second condition as the function automatically selected based on the second scheme when the probability exceeds a reference value.

In one implementation, the processor may determine whether an amount of current supplied to and consumed in the first controller exceeds a reference current amount when it is determined to supply the power to the first controller that controls the function selected based on the selection scheme.

In one implementation, the processor may output a guidance message guiding the user to determine whether to cut off the power supplied to the first controller when the amount of current supplied to and consumed in the first controller exceeds the reference current amount.

In one implementation, the processor may maintain the power supply to the first controller when there is an intended signal input from the user after the guidance message guiding the user to determine whether to cut off the power supplied to the first controller is output.

In one implementation, the processor may cut off the power supplied to the first controller when there is no intended signal input from the user after the guidance message guiding the user to determine whether to cut off the power supplied to the first controller is output.

According to another aspect of the present disclosure, a method for controlling a vehicle includes activating, by a processor, a utility mode based on an input of a user, setting, by the processor, a selection scheme for selecting a function to be used among functions controllable in the utility mode, determining, by the processor, whether to supply power to a first controller for controlling a function selected based on the selection scheme and a second controller for controlling an unselected function, and controlling, by the processor, to supply the power or cut off the power to the first controller in response to determination result.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
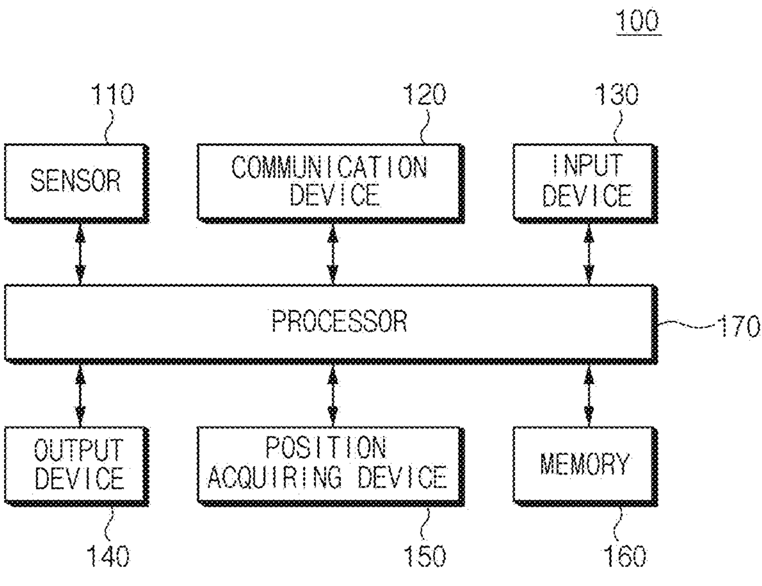
FIG. 1 is a diagram showing a configuration of a vehicle control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram showing a configuration of a vehicle control device according to an embodiment of the present disclosure.

As shown in FIG. 1, a vehicle control device 100 of the present disclosure may include a sensor 110, a communication device 120, an input device 130, an output device 140, a position acquiring device 150, a memory 160, and a processor 170.

The sensor 110 may acquire vehicle state information. According to one embodiment, the sensor 110 may include a battery sensor, a vehicle internal temperature sensor, a vehicle internal humidity sensor, an illuminance sensor, and the like. Accordingly, the sensor 110 may acquire battery information, vehicle internal temperature information, vehicle internal humidity information, illuminance information, and the like.

The communication device 120 may include a transceiver that transmits and receives information using an antenna, a communication circuit, a communication processor, and the like, and may be in communication with a mobile terminal of a user, a server that provides various information (e.g., weather information and map information), and the like in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The input device 130 may receive an input corresponding to a touch, a motion, or a voice of the user and transmit the input to the processor 170, and the processor 170 may control an operation of the vehicle control device in response to input information. According to one embodiment, the input device 130 may include touch input means or mechanical input means. As an example, the input device

130 may be implemented as a scroll wheel, a button, a knob, a touch screen, a touch pad, a lever, a track ball, and the like that may be manipulated by the user, or may be implemented as at least one of a motion sensor or a voice recognition sensor that senses the motion or the voice of the user, or any combination thereof.

The output device 140 may output an image or a sound under control of the processor 170. According to one embodiment, the output device 140 may be implemented as a display device, a sound output device, or the like. In this regard, the display device may include a heads-up display (HUD), a cluster, and the like. According to one embodiment, the display device may be implemented as a display device employing a liquid crystal display (LCD) panel, a light emitting diode (LED) panel, an organic light emitting diode (OLED) panel, a plasma display panel (PDP), or the like. The liquid crystal display may include a thin film transistor LCD (TFT-LCD). The display device may be integrally implemented with a touch screen panel (TSP).

The position acquiring device 150 may be equipped with a GPS receiver and acquire location information of a vehicle, and map-match a location of the vehicle to pre-stored map data and provide a map image within a predetermined distance from the location of the vehicle.

The memory 160 may store at least one algorithm that performs calculation or execution of various commands for the operation of the vehicle control device according to one embodiment of the present disclosure. According to one embodiment, the memory 160 may store at least one command executed by the processor 170, and the command may cause the vehicle control device of the present disclosure to operate. The memory 160 may include at least one storage medium among a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 170 may be implemented by a variety of processing devices with a built-in semiconductor chip or the like that may calculate or execute the various commands, and may control the operation of the vehicle control device according to one embodiment of the present disclosure. The processor 170 may be electrically connected to the sensor 110, the communication device 120, the input device 130, the output device 140, the position acquiring device 150, and the memory 160 via a wired cable or various circuits and transmit an electrical signal including a control command or the like, and may perform calculation or data processing regarding control and/or communication. The processor 170 may include at least one of a central processing unit, an application processor, or a communication processor (CP), or any combination thereof.

According to one embodiment, the processor 170 may output a message guiding the user boarded the vehicle to input a user ID. The processor 170 may verify the user based on the user ID input by the user.

When the user boarded the vehicle is verified, the processor 170 may determine whether a utility mode (Utility) is selected based on the input of the user received via the input device 130 in a user setting mode for controlling the vehicle and the utility mode is activated. In this regard, the utility mode may refer to a mode in which a function provided by a convenience device (e.g., an air conditioner, an audio, a lighting, an AVN, and the like) in the vehicle excluding driving may be used using a high-voltage battery (a battery for driving an electric vehicle) instead of a low-voltage battery (a 12 V auxiliary battery) when a shift mode is a "park (P)" and a parking brake is engaged.

When a selection scheme for selecting a function to be used by the user among the functions that may be controlled in the utility mode is set, the processor 170 may determine whether to supply power to a first controller that controls the function selected based on the selection scheme and a second controller that controls an unselected function.

According to one embodiment, the processor 170 may output a guidance message that guides the user to set the selection scheme via the output device 140. According to one embodiment, the processor 170 may output the guidance message that guides the user to determine whether to set the selection scheme to a first scheme that is a manual selection mode in which the function to be used by the user is selected based on the input of the user or to a second scheme that is an automatic selection mode in which the function to be used by the user is automatically selected.

According to one embodiment, when the selection scheme is set to the first scheme by the input of the user and a first function to be used by the user is selected based on the first scheme, the processor 170 may determine to supply the power to the first controller to control the first function, and determine to cut off the power supply to the second controller.

As an example, when the selection scheme is set to the first scheme and it is determined that an air conditioning function is selected as the function to be used by the user based on the first scheme, the processor 170 may determine to supply the power to an air conditioning controller (the first controller that controls the selected function) to control the air conditioning function, and may determine to cut off the power supply to remaining controllers (the second controllers that control the unselected functions) excluding the air conditioning controller.

When it is determined that the power supply to the first controller is determined to control the first function, the processor 170 may store the first controller to control the first function and a first condition in which the power is supplied to the first controller to control the first function.

As an example, when it is determined that the air conditioning function is selected as the first function by a first user and the power supply to the air conditioning controller is determined to control the air conditioning function, the processor 170 may store a condition (e.g., a vehicle internal temperature when the first user selects the air conditioning function) in which the power is supplied to the air conditioning controller to control the air conditioning function. For example, when the first user boards the vehicle and selects the air conditioning function when the vehicle internal temperature is 25 degrees or higher, the processor 170 may store the condition in which the power is supplied to the air conditioning controller as the case in which the first user boards the vehicle and the vehicle internal temperature is 25 degrees or higher.

The processor 170 may count the number of times the power is supplied to the first controller to control the first function in the first condition for a predetermined period (e.g., a period in which the number of times the utility mode is activated, the first user boards the vehicle, and the selection scheme is set to the first scheme reaches a predetermined number of times), and calculate a probability that the power is supplied to the first controller to control the first function under the first condition.

As an example, when the number of times the power is supplied to the first controller to control the first function under the first condition is 7 while the number of times the utility mode is activated, the first user boards the vehicle, and the selection scheme is set to the first scheme reaches 10, the processor 170 may calculate that the probability that the power is supplied to the first controller to control the first function under the first condition is 70%.

When the calculated probability exceeds a reference value, the processor 170 may store the first function controlled in the first condition corresponding to the user boarded the vehicle as the function automatically selected based on the second scheme.

As an example, the processor 170 may store the air conditioning function as the function automatically selected when the second scheme (the automatic selection mode) is set and the first condition (a case in which the user boarded the vehicle is the first user and the internal temperature is 27 degrees or higher) is satisfied.

In one example, the processor 170 may determine whether the selection scheme is set to the second scheme and whether the function automatically selected in the second scheme corresponding to the user boarded the vehicle is stored.

According to one embodiment, when the function automatically selected based on the second scheme corresponding to the user boarded the vehicle is stored, and when the selection scheme is set to the second scheme by the input of the user, the processor 170 may determine to supply the power to the first controller to control the function automatically selected based on the second scheme, and determine to cut off the power supply to the remaining controllers (the second controllers that control the functions that are not automatically selected).

On the other hand, when the function automatically selected in the second scheme is not stored, the processor 170 may acquire at least one of vehicle surroundings information or the vehicle state information, or any combination thereof corresponding to the user boarded the vehicle, and select the function to be used based on the at least one of the vehicle surroundings information or the vehicle state information, or any combination thereof.

As an example, when the function automatically selected in the second scheme is not stored, the processor 170 may acquire the weather information around the vehicle, the vehicle location information, AVN use information while the vehicle travels, and the like corresponding to the user boarded the vehicle, and may select the function to be used based on the acquired information.

For example, when the internal temperature of the vehicle is 24 degrees or higher after the second scheme is set corresponding to the user boarded the vehicle, the processor 170 may allow the air conditioning function to be selected. Additionally, when music is played while the vehicle travels, the processor 170 may allow a function to replay the music played while the vehicle travels to be selected when the second scheme is set. Additionally, when a location of the vehicle where the second scheme is set is a point of interest (POI) (e.g., a camping site) set in advance by the user, the processor 170 may allow a function useful in the POI to be selected.

When the function to be used is selected based on the at least one of the vehicle surroundings information or the vehicle state information, or any combination thereof after the second scheme is set, the processor 170 may output a guidance message that guides the selected function.

In addition, the processor 170 may output a guidance message that guides the user to select an additional function.

The processor 170 may determine whether the additional function has been selected corresponding the guidance message that guides the user to select the additional function.

When it is determined that the additional function has been selected, the processor 170 may control the power to be supplied to the first controller to control the additional function.

The processor 170 may store the first controller to control the additional function corresponding to the user boarded the vehicle and a second condition in which the power is supplied to the first controller to control the additional function.

The processor 170 may count the number of times the power is supplied to the first controller to control the additional function in the second condition for a period (e.g., a period in which the number of times the utility mode is activated, the selection scheme is set to the second scheme, and the additional function is set reaches a predetermined number of times) determined in advance corresponding to the user boarded the vehicle, and calculate a probability that the power is supplied to the first controller to control the additional function under the second condition.

As an example, when the number of times the power is supplied to the first controller to control the additional function under the second condition is 8 while the number of times the first user boards the vehicle, the utility mode is activated, the selection scheme is set to the second scheme, and the additional function is set reaches 10, the processor 170 may calculate that the probability that the power is supplied to the first controller to control the additional function under the second condition when the first user boards the vehicle is 80%.

When the calculated probability exceeds the reference value, the processor 170 may store the additional function controlled in the second condition corresponding to the user boarded the vehicle as the function automatically selected based on the second scheme.

As an example, when the additional function set by the user is the air conditioning function, the processor 170 may store the air conditioning function as the function automatically selected when the second scheme (the automatic selection mode) is set and the second condition (e.g., the case in which the user boarded the vehicle is the first user and the internal temperature is 27 degrees or higher) is satisfied.

When the function is selected based on the first scheme or the second scheme, the processor 170 may control the input device 130 to be activated to operate the selected function. The processor 170 may select the first controller that should remain supplied with the power.

According to one embodiment, when the function selected based on the first scheme or the second scheme is the audio, the processor 170 may activate the input device 130 that may select a channel and a broadcast of the audio and select an AVN controller as the first controller that should remain supplied with the power.

According to one embodiment, when the function selected based on the first scheme or the second scheme is the indoor lighting, the processor 170 may activate the input device 130 (e.g., an AVN screen and an indoor lighting switch) that may adjust brightness of the indoor lighting and select the AVN controller and an indoor lighting controller as the first controllers that should remain supplied with the power.

According to one embodiment, when the function selected based on the first scheme or the second scheme is cooling, heating, and air conditioning, the processor 170 may activate the input device 130 (e.g., a temperature adjustment switch and a dual automatic temperature control (DATC) screen) that may adjust the temperature and select the air conditioning controller (a DATC controller) as the first controller that should remain supplied with the power.

The processor 170 may control the power to be supplied to the selected first controller. The processor 170 may control the power supply to be cut off to the remaining controllers excluding the first controller.

The processor 170 may control the power supply to the first controller to be maintained for an arbitrary period.

The processor 170 may determine whether an amount of current supplied to and consumed in the first controller for the arbitrary period exceeds a reference current amount.

When it is determined that the amount of current supplied to and consumed in the first controller for the arbitrary period exceeds the reference current amount, the processor 170 may output a guidance message that guides the user to determine whether to cut off the power supplied to the first controller. As an example, processor 170 may output the guidance message such as "Power supplied to the first controller will be cut off. If you do not agree, please touch."

When there is an intended input from the user after the guidance message that guides the user to determine whether to cut off the power supplied to the first controller is output, the processor 170 may maintain the power supply to the first controller. According to one embodiment, when there is the intended input from the user, the processor 170 may determine that the user does not agree to cut off the power supplied to the first controller.

When there is no intended input from the user, the processor 170 may cut off the power supplied to the first controller.

Figure 2:
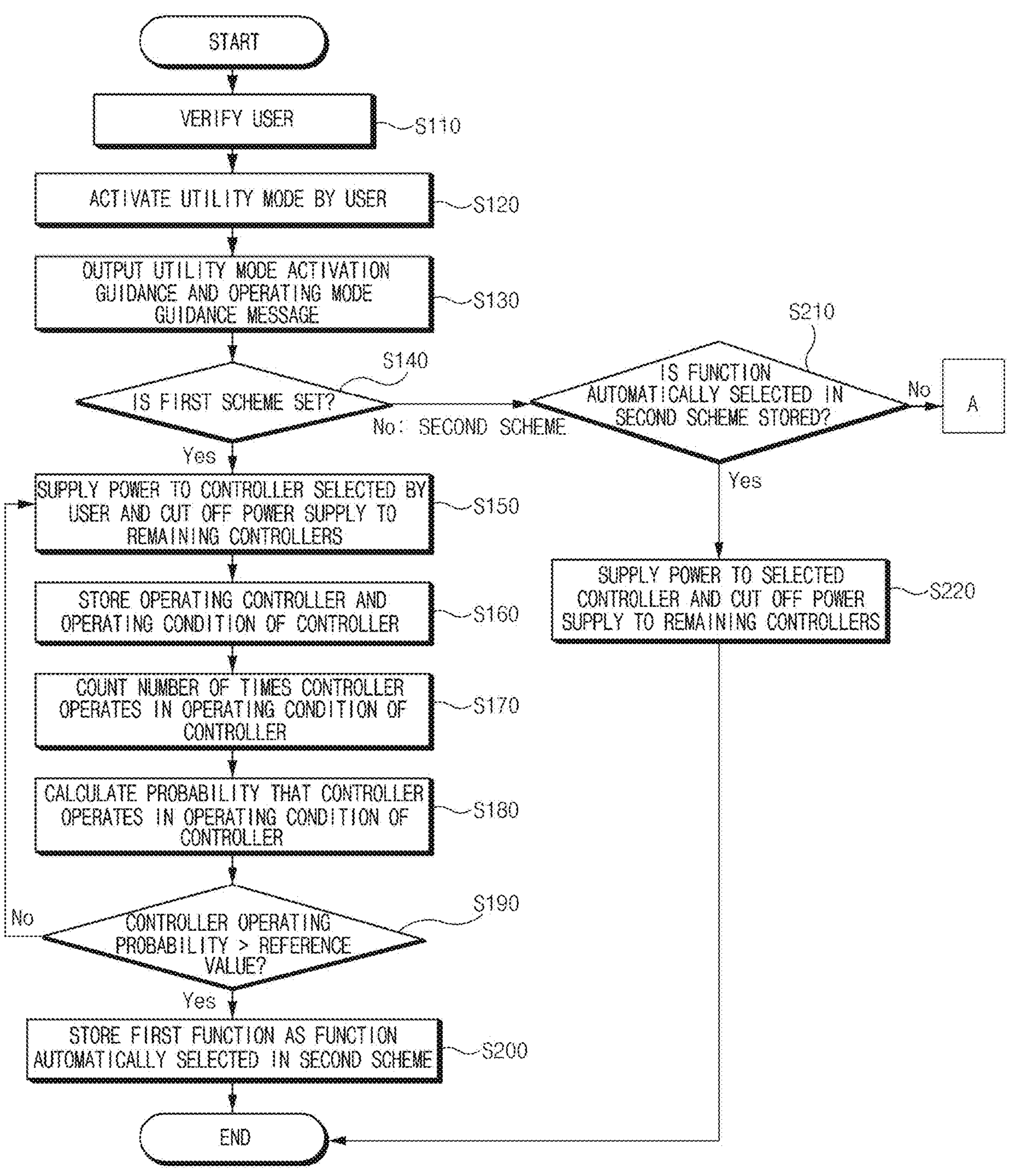
FIGS. 2, 3, and 4 are flowcharts showing a vehicle control method according to an embodiment of the present disclosure.
Figure 3:
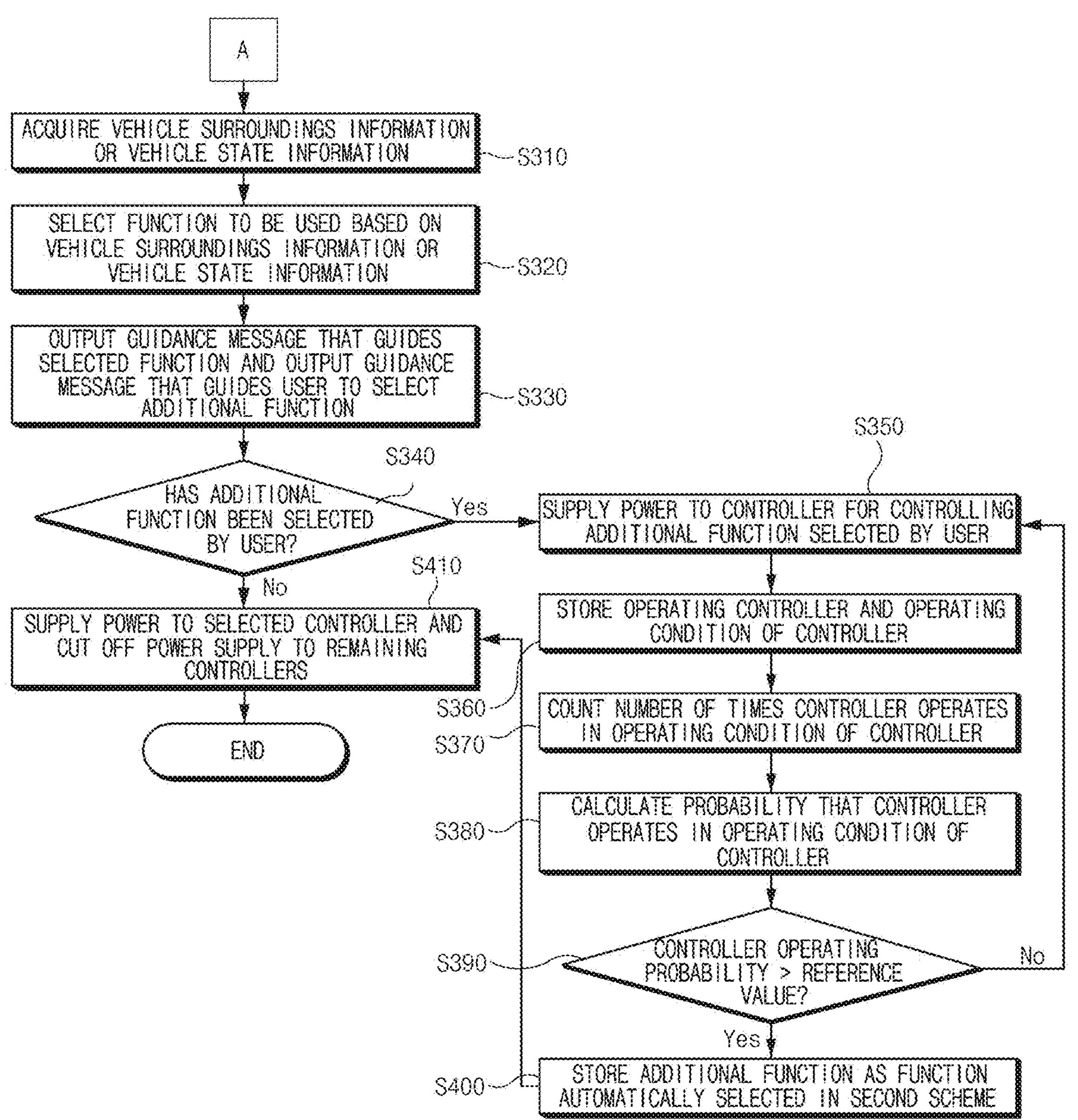
Figure 4:
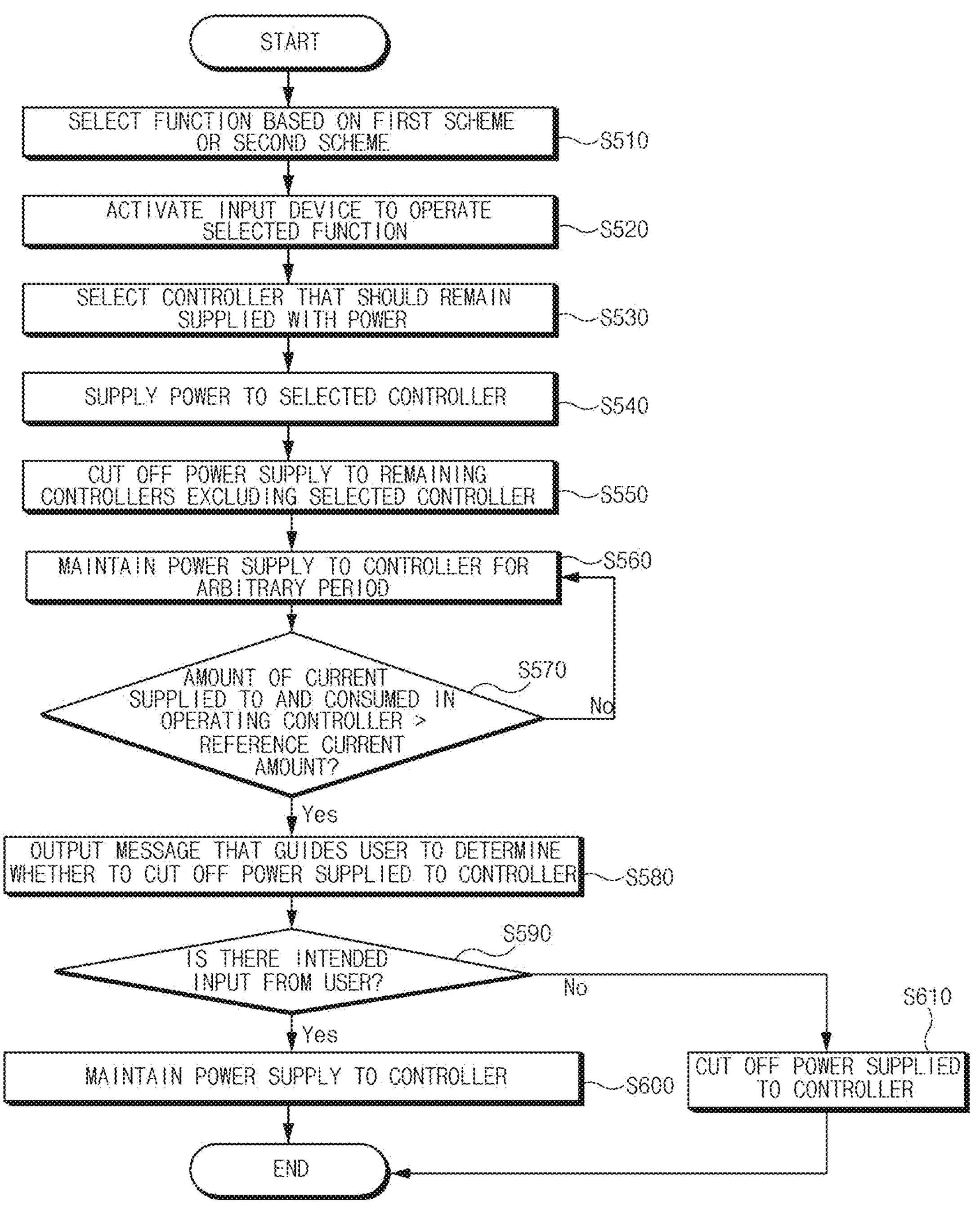

FIGS. 2 to 4 are flowcharts showing a vehicle control method according to an embodiment of the present disclosure.

As shown in FIG. 2, the processor 170 may output the message guiding the user boarded the vehicle to input the user ID. The processor 170 may verify the user based on the user ID input by the user (S110).

When the user boarded the vehicle is verified, and when the utility mode (the Utility) is selected based on the input of the user received via the input device 130 in the user setting mode for controlling the vehicle, the processor 170 may determine that the utility mode is activated (S120). In this regard, the utility mode may refer to the mode in which the function provided by the convenience device (e.g., the air conditioner, the audio, the lighting, the AVN, and the like) in the vehicle excluding the driving may be used using the high-voltage battery (the battery for driving the electric vehicle) instead of the low-voltage battery (the 12 V auxiliary battery) when the shift mode is the "park (P)" and the parking brake is engaged.

When the selection scheme for selecting the function to be used by the user among the functions that may be controlled in the utility mode is set as the first scheme, the processor 170 may determine whether to supply the power to the first controller that controls the function selected based on the selection scheme and the second controller that controls the unselected function.

According to one embodiment, the processor 170 may output the guidance message that guides the user to set the selection scheme via the output device 140 (S130). According to one embodiment, the processor 170 may output the guidance message that guides the user to determine whether to set the selection scheme to the first scheme that is the manual selection mode in which the function to be used by the user is selected based on the input of the user or to the second scheme that is the automatic selection mode in which the function to be used by the user is automatically selected.

According to one embodiment, the processor 170 may determine whether the selection scheme is set to the first scheme by the input of the user (S140).

When the first function to be used by the user is selected based on the first scheme, the processor 170 may determine to supply the power to the first controller to control the first function, and determine to cut off the power supply to the second controller (S150).

As an example, when it is determined in S150 that the selection scheme is set to the first scheme and the air conditioning function is selected as the function to be used by the user based on the first scheme, the processor 170 may determine to supply the power to the air conditioning controller (the first controller that controls the selected function) to control the air conditioning function, and may determine to cut off the power supply to remaining controllers (the second controllers that control the unselected functions) excluding the air conditioning controller.

When it is determined that the power supply to the first controller is determined to control the first function, the processor 170 may store the first controller to control the first function and the first condition in which the power is supplied to the first controller to control the first function (S160).

As an example, when it is determined in S160 that the air conditioning function is selected as the first function by the first user and the power supply to the air conditioning controller is determined to control the air conditioning function, the processor 170 may store the condition (e.g., the vehicle internal temperature when the first user selects the air conditioning function) in which the power is supplied to the air conditioning controller to control the air conditioning function. For example, when the first user boards the vehicle and selects the air conditioning function when the vehicle internal temperature is 25 degrees or higher, the processor 170 may store the condition in which the power is supplied to the air conditioning controller as the case in which the first user boards the vehicle and the vehicle internal temperature is 25 degrees or higher.

The processor 170 may count the number of times the first user boards the vehicle and the power is supplied to the first controller to control the first function in the first condition for the predetermined period (e.g., the period in which the number of times the utility mode is activated and the selection scheme is set to the first scheme reaches the predetermined number of times) (S170), and calculate the probability that the power is supplied to the first controller to control the first function under the first condition (S180).

As an example, when the number of times the power is supplied to the first controller to control the first function under the first condition is 7 while the number of times the utility mode is activated, the first user boards the vehicle, and the selection scheme is set to the first scheme reaches 10, the processor 170 may calculate that the probability that the power is supplied to the first controller to control the first function under the first condition is 70%.

The processor 170 may determine whether the calculated probability exceeds the reference value (S190).

When the calculated probability exceeds the reference value in S190, the processor 170 may store the first function controlled in the first condition corresponding to the user boarded the vehicle as the function automatically selected based on the second scheme (S200).

As an example, in S200, the processor 170 may store the air conditioning function as the function automatically selected when the second scheme (the automatic selection mode) is set and the first condition is satisfied.

In one example, in S140, when the selection scheme is not set to the first scheme, the processor 170 may determine that the selection scheme is set to the second scheme.

When the selection scheme is set to the second scheme, the processor 170 may determine whether the function automatically selected in the second scheme corresponding to the user boarded the vehicle is stored (S210).

According to one embodiment, when it is determined in S210 that the function automatically selected based on the second scheme corresponding to the user boarded the vehicle is stored, and when the selection scheme is set to the second scheme by the input of the user, the processor 170 may determine to supply the power to the first controller to control the function automatically selected based on the second scheme, and determine to cut off the power supply to the remaining controllers (the second controllers that control the functions that are not automatically selected) (S220).

When the function automatically selected in the second scheme corresponding to the user boarded the vehicle is not stored in S210, the processor 170 may perform "A". Operations after the "A" will be described with reference to FIG. 3.

As shown in FIG. 3, the processor 170 may acquire at least one of the vehicle surroundings information or the vehicle state information, or any combination thereof (S310).

The processor 170 may select the function to be used based on the at least one of the vehicle surroundings information or the vehicle state information, or any combination thereof corresponding to the user boarded the vehicle (S320).

As an example, in S320, the processor 170 may acquire the weather information around the vehicle, the vehicle location information, the AVN use information while the vehicle travels, and the like corresponding to the user boarded the vehicle, and may select the function to be used based on the acquired information.

For example, when the internal temperature of the vehicle is 24 degrees or higher after the second scheme is set, the processor 170 may allow the air conditioning function to be selected. Additionally, when the music is played while the vehicle travels, the processor 170 may allow the function to replay the music played while the vehicle travels to be selected when the second scheme is set. Additionally, when the location of the vehicle where the second scheme is set is the point of interest (POI) (e.g., the camping site) set in advance by the user, the processor 170 may allow the function useful in the POI to be selected.

When the function to be used is selected based on the at least one of the vehicle surroundings information or the vehicle state information, or any combination thereof after the second scheme is set, the processor 170 may output the guidance message that guides the selected function (S330).

In addition, in S330, the processor 170 may output the guidance message that guides the user to select the additional function.

The processor 170 may determine whether the additional function has been selected corresponding the guidance message that guides the user to select the additional function (S340).

When it is determined in S340 that the additional function has been selected, the processor 170 may control the power to be supplied to the first controller to control the additional function (S350).

The processor 170 may store the first controller to control the additional function corresponding to the user boarded the vehicle and the second condition in which the power is supplied to the first controller to control the additional function (S360).

The processor 170 may count the number of times the power is supplied to the first controller to control the additional function in the second condition for the period (e.g., the period in which the number of times the utility mode is activated, the selection scheme is set to the second scheme, and the additional function is set reaches the predetermined number of times) determined in advance corresponding to the user boarded the vehicle (S370), and calculate the probability that the power is supplied to the first controller to control the additional function under the second condition (S380).

As an example, when the number of times the power is supplied to the first controller to control the additional function under the second condition is 8 while the number of times the first user boards the vehicle, the utility mode is activated, the selection scheme is set to the second scheme, and the additional function is set reaches 10, the processor 170 may calculate that the probability that the power is supplied to the first controller to control the additional function under the second condition when the first user boards the vehicle is 80%.

When the calculated probability exceeds the reference value (S390), the processor 170 may store the additional function controlled in the second condition corresponding to the user boarded the vehicle as the function automatically selected based on the second scheme (S400).

When the function to be used by the user is selected based on the second scheme, the processor 170 may determine to supply the power to the first controller to control the selected function and cut off the power supply to the second controller (S410).

As shown in FIG. 4, the processor 170 may determine that the function is selected based on the first scheme or the second scheme (S510).

The processor 170 may control the input device 130 to be activated to operate the selected function (S520).

The processor 170 may select the first controller that should remain supplied with the power (S530).

According to one embodiment, when the function selected based on the first scheme or the second scheme is the audio in S530, the processor 170 may activate the input device 130 that may select the channel and the broadcast of the audio and select the AVN controller as the first controller that should remain supplied with the power.

According to one embodiment, when the function selected based on the first scheme or the second scheme is the indoor lighting in S530, the processor 170 may activate the input device 130 (e.g., the AVN screen and the indoor lighting switch) that may adjust the brightness of the indoor lighting and select the AVN controller and the indoor lighting controller as the first controllers that should remain supplied with the power.

According to one embodiment, when the function selected based on the first scheme or the second scheme is the cooling, the heating, and the air conditioning in S530, the processor 170 may activate the input device 130 (e.g., the temperature adjustment switch and the dual automatic temperature control (DATC) screen) that may adjust the temperature and select the air conditioning controller (the DATC controller) as the first controller that should remain supplied with the power.

The processor 170 may be controlled to supply the power to the selected first controller (S540).

The processor 170 may control the power supply to be cut off to the remaining controllers excluding the first controller (S550).

The processor 170 may control the power supply to the first controller to be maintained for the arbitrary period (S560).

The processor 170 may determine whether the amount of current supplied to and consumed in the first controller for the arbitrary period exceeds the reference current amount (S570).

When it is determined that the amount of current supplied to and consumed in the first controller for the arbitrary period exceeds the reference current amount, the processor 170 may output the guidance message that guides the user to determine whether to cut off the power supplied to the first controller (S580).

As an example, in S580, the processor 170 may output the guidance message such as "Power supplied to the first controller will be cut off. If you do not agree, please touch.".

The processor 170 may determine whether there is the intended input from the user after the guidance message that guides the user to determine whether to block the power supplied to the first controller is output (S590).

When there is the intended input from the user in S590, the processor 170 may maintain the power supply to the first controller (S600). According to one embodiment, when there is the intended input from the user, the processor 170 may determine that the user does not agree to cut off the power supplied to the first controller.

When there is no intended input from the user in S590, the processor 170 may cut off the power supplied to the first controller (S610).

Figure 5:
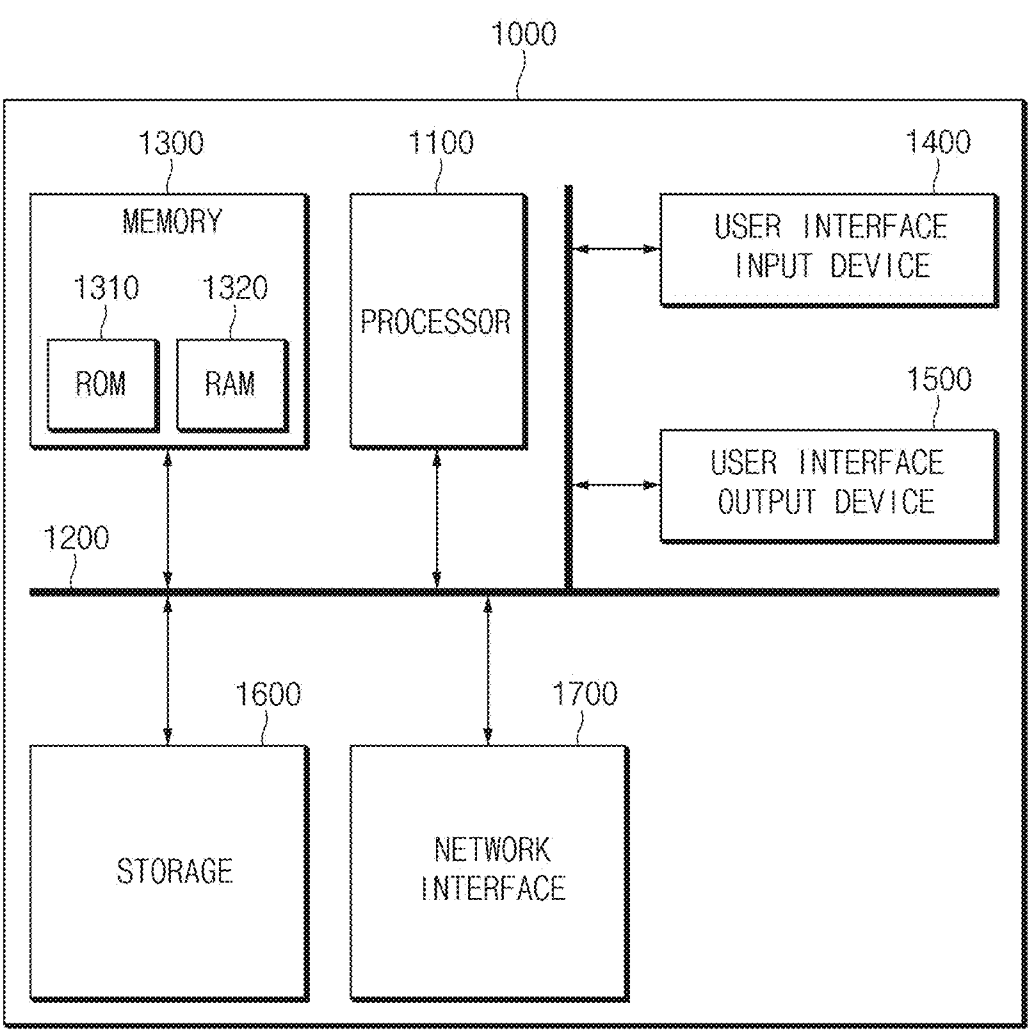
FIG. 5 illustrates a configuration of a computing system for executing a method according to an embodiment of the present disclosure.

FIG. 5 illustrates a configuration of a computing system for executing a method according to an embodiment of the present disclosure.

With reference to FIG. 5, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the vehicle according to one embodiment of the present disclosure may prevent the unnecessary battery discharge by allowing only the functions selected by the user in the utility mode of the electric vehicle to operate and turning off the unselected functions.

The device and the method for controlling the vehicle according to one embodiment of the present disclosure may prevent the unnecessary battery discharge by automatically selecting the function to be provided to the user based on the vehicle location and the surrounding environment information and turning off the unselected function even when the user does not select the function in the utility mode of the electric vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A device for controlling a vehicle, the device comprising:

- an input device configured to receive an input of a user; and
- a processor configured to:
- determine whether to supply power to a first controller for controlling a function selected based on a selection scheme, and a second controller for controlling an unselected function when it is determined that a utility mode is activated based on the input of the user, and the selection scheme for selecting a function to be used among functions controllable in the utility mode is set; and
- control to supply the power or cut off the power to the first controller in response to the determination result;
- wherein the utility mode is a mode in which a function excluding driving is usable in the vehicle while the vehicle is stationary; and
- wherein, when the selection scheme is set to a second scheme and it is determined that a function automatically selected based on the second scheme is not stored, the processor is further configured to acquire at least one of vehicle surroundings information or vehicle state information, or a combination thereof, and to select the function to be used based on the at least one of the vehicle surrounding information or the vehicle state information, or a combination thereof.

2. The device of claim 1, wherein the processor is further configured to output a guidance message guiding the user to set the selection scheme.

3. The device of claim 1, wherein the selection scheme includes a first scheme of selecting a function to be used based on the input of the user, and a second scheme of automatically selecting the function to be used.

4. The device of claim 3, wherein the processor is further configured to determine to supply the power to the first controller to control a first function, and to determine to cut off the power supply to the second controller when the selection scheme is set to the first scheme, and wherein the first function to be used is selected based on the first scheme.

5. The device of claim 4, wherein the processor is further configured to store information related to the first controller for controlling the first function, and to store a first condition where the power is supplied to the first controller to control the first function when the power supply to the first controller is determined to control the first function.

6. The device of claim 5, wherein the processor is further configured to:

count a number of times the power is supplied to the first controller to control the first function in the first condition for a predetermined period; and calculate a probability that the power is supplied to the first controller to control the first function in the first condition.

7. The device of claim 6, wherein the processor is further configured to store the first function controlled in the first condition as the function automatically selected based on the second scheme when the probability exceeds a reference value.

8. The device of claim 3, wherein the processor is further configured to determine whether the function automatically selected based on the second scheme is stored when the selection scheme is set to the second scheme.

9. The device of claim 8, wherein the processor is further configured to supply the power to the first controller to control the function automatically selected based on the second scheme, and to cut off the power supply to the second controller when the selection scheme is set to the second scheme and it is determined that the function automatically selected based on the second scheme is stored.

10. The device of claim 9, wherein the processor is further configured to output a guidance message guiding the function selected based on the at least one of the vehicle surroundings information or the vehicle state information, or a combination thereof.

11. The device of claim 9, wherein the processor is further configured to determine whether an additional function has been selected by the user in addition to the function selected based on the at least one of the vehicle surroundings information or the vehicle state information, or a combination thereof.

12. The device of claim 11, wherein the processor is further configured to store information related to the first controller for controlling the additional function and a second condition where the power is supplied to the first controller to control the additional function when it is determined that the additional function has been selected.

13. The device of claim 12, wherein the processor is further configured to:

count a number of times the power is supplied to the first controller to control the additional function in the second condition for a predetermined period; and calculate a probability that the power is supplied to the first controller to control the additional function in the second condition.

14. The device of claim 13, wherein the processor is further configured to store the additional function controlled in the second condition as the function automatically selected based on the second scheme when the probability exceeds a reference value.

15. The device of claim 1, wherein the processor is further configured to determine whether an amount of current supplied to and consumed in the first controller exceeds a reference current amount when it is determined to supply the power to the first controller configured to control the function selected based on the selection scheme.

16. The device of claim 15, wherein the processor is further configured to output a guidance message guiding the user to determine whether to cut off the power supplied to the first controller when the amount of current supplied to and consumed in the first controller exceeds the reference current amount.

17. The device of claim 16, wherein the processor is further configured to maintain the power supply to the first controller when there is an intended signal input from the user after the guidance message guiding the user to determine whether to cut off the power supplied to the first controller is output.

18. The device of claim 16, wherein the processor is further configured to cut off the power supplied to the first controller when there is no intended signal input from the user after the guidance message guiding the user to determine whether to cut off the power supplied to the first controller is output.

19. A method for controlling a vehicle, the method comprising:

activating, by a processor, a utility mode based on an input of a user;

setting, by the processor, a selection scheme for selecting a function to be used among functions controllable in the utility mode; and determining, by the processor, whether to supply power to a first controller for controlling a function selected based on the selection scheme and a second controller for controlling an unselected function, controlling, by the processor, to supply the power or cut off the power to the first controller in response to the determination result;

wherein the utility mode is a mode in which a function excluding driving is usable in the vehicle while the vehicle is stationary; and wherein, when the selection scheme is set to a second scheme and it is determined that a function automatically selected based on the second scheme is not stored, the processor is further configured to acquire at least one of vehicle surroundings information or vehicle state information, or a combination thereof, and select the function to be used based on the at least one of the vehicle surrounding information or the vehicle state information, or a combination thereof.

* * * * *